United States Patent
Gagne et al.

(10) Patent No.: US 7,310,743 B1
(45) Date of Patent: *Dec. 18, 2007

(54) DATA RECOVERY METHOD AND APPARATUS

(75) Inventors: Mathieu Gagne, Boston, MA (US); Haim Kopylovitz, Brookline, MA (US); Ishay Kedem, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 370 days.

This patent is subject to a terminal disclaimer.

(21) Appl. No.: 11/047,138

(22) Filed: Jan. 31, 2005

Related U.S. Application Data

(63) Continuation of application No. 10/799,972, filed on Mar. 12, 2004, now Pat. No. 6,868,506, which is a continuation of application No. 09/879,347, filed on Jun. 12, 2001, now Pat. No. 6,742,138.

(51) Int. Cl.
*G06F 11/00* (2006.01)
(52) U.S. Cl. .......................................................... 714/6
(58) Field of Classification Search ................... 714/6; 711/119, 126
See application file for complete search history.

(56) References Cited

U.S. PATENT DOCUMENTS

| | | | |
|---|---|---|---|
| 5,206,939 A | 4/1993 | Yanai et al. | |
| 5,381,545 A | 1/1995 | Baker et al. | |
| 5,615,329 A * | 3/1997 | Kern et al. ..................... | 714/6 |
| 5,692,155 A | 11/1997 | Iskiyan et al. | |
| 5,720,026 A | 2/1998 | Uemura et al. | |
| 5,721,918 A | 2/1998 | Nilsson et al. | |
| 5,852,713 A | 12/1998 | Shannon | |
| 5,870,759 A | 2/1999 | Bauer et al. | |
| 5,870,760 A | 2/1999 | Demers et al. | |
| 6,088,815 A | 7/2000 | West et al. | |
| 6,101,497 A | 8/2000 | Ofek | |
| 6,185,695 B1 | 2/2001 | Murphy et al. | |
| 6,199,074 B1 | 3/2001 | Kern et al. | |
| 6,275,897 B1 | 8/2001 | Bachmat | |
| 6,671,705 B1 | 12/2003 | Duprey et al. | |
| 6,671,786 B2 | 12/2003 | Wang et al. | |
| 6,728,898 B2 | 4/2004 | Tremblay et al. | |
| 6,772,303 B2 | 8/2004 | Crockett et al. | |
| 2003/0212870 A1 | 11/2003 | Nowakowski | |

* cited by examiner

*Primary Examiner*—Bryce P Bonzo
(74) *Attorney, Agent, or Firm*—George A. Herbster

(57) ABSTRACT

A method and apparatus for data recovery in a system involving a first data store acting as a standard device and a physical moving mirror data store that operates as moving mirror with a first mode to be synchronized and in a second, isolated mode. In response to a command to establish a third or protected restore operating mode, the data to be transferred in response to that command is identified. A restoration procedure copies data from the second data store to the first store to recover any data that may have been corrupted in the second data store. An update procedure acts on the restored data concurrently with the restoration procedure.

18 Claims, 7 Drawing Sheets

DATA RECOVERY METHOD AND APPARATUS

This application is a continuation of U.S. patent application Ser. No. 10/799,972, filed Mar. 12, 2004 now U.S. Pat. No. 6,868,506 which is a continuation of U.S. patent application Ser. No. 09/879,347, filed Jun. 12, 2001 (now U.S. Letters Pat. No. 6,742,138 issued May 25, 2004).

BACKGROUND OF THE INVENTION

1. Field of the Invention

This invention generally relates to the maintenance of data redundancy in a data storage facility and more particularly to recovering data in such a facility.

2. Description of Related Art

Many data processing applications now operate on digital data processing systems that incorporate large scale memory facilities. These large scale memory facilities take many forms. One such form is a disk array storage device (DASD) in which data is stored at a local large scale disk memory with many physical disk drives. In other applications it may be desired to distribute the functions of equivalent devices over a network at different network nodes in a local-area or wide-area network.

When data integrity is critical, such large scale disk memory facilities include some type of data redundancy. Memory mirrors provide on-site redundancy to protect against equipment failure. U.S. Pat. No. 5,206,939 to Yanai et al. and assigned to the same assignee as this invention discloses a remote system that normally acts as a mirror of a local system. The geographical separation between the local and remote systems provides an extremely high degree of reliability, particularly as protection against a natural disaster.

More recently U.S. Pat. No. 6,101,497 granted Aug. 8, 2000 discloses a tool that is particularly well adapted for facilitating redundancy. This device, called a BCV device, establishes a special physical disk structure that acts as a moving physical mirror to attach to and to synchronize with a standard device with one or more fixed physical mirrors without interfering with normal operations between an application program being run by a host using data on the standard device. Once the data in this BCV moving mirror is synchronized with the data in the standard device, it can be split or isolated from the standard device and thereafter be available for backup or for use by another application.

As known, data on a standard device can, for a variety of reasons, become corrupt. As described in the foregoing U.S. Pat. No. 6,101,497, a restore or an incremental restore command initiates a restoration procedure that copies data from the redundant BCV physical mirror to the standard device, assuming that data on the BCV physical mirror has not been changed. For example, a BCV physical mirror used as a source for a tape backup will maintain the data without change. In this situation, the data on the BCV physical mirror represents the data that existed when the BCV physical mirror was isolated from the standard device. So it does not represent the data that actually exists on the standard device if an event occurs that requires restoration; rather it represents the data that existed at some earlier point in time.

However, many databases and other applications maintain a log file, or like file that records each transfer and the sequence of each transfer. Entries from such a file from a point in time after the prior isolation can be used to recover or update the data fully on the standard volume. One such update procedure is known as "unrolling the redo logs". During this procedure, the BCV device may be attached to the standard device. As each log entry is processed, a write operation transfers the data associated with that log entry to both the standard device and the BCV physical mirror. Consequently, after the first write operation occurs, the data on the BCV physical mirror is no longer identical to the data that had been on the BCV physical mirror at the time of a prior split.

Oftentimes errors can occur while performing an update procedure like unrolling the redo logs thereby corrupting the data on the standard device and, due to the mirroring function, the data on the BCV physical mirror. When this occurs it may be required to recover data from a tape backup made even earlier in time and again try to reconstruct the current data by unrolling the redo logs for a longer time interval. Data recovery involving tape backups can be time consuming and tedious. What is needed is a process by which the data used on a mirror for restoration, like data on a BCV physical mirror, is not altered until an update procedure, such as unrolling the redo logs, has been completed without error.

With prior data recovery operations, data from a BCV physical mirror is restored to a standard device before an update procedure, such as unrolling the redo logs, is initiated. Conducting the restoration and update procedures in series can result in long downtime for a production volume. What is needed is a data recovery operation that enables the restoration and update procedures to occur concurrently.

SUMMARY

Therefore it is an object of this invention to improve a facility for recovering data from a redundancy device.

Another object of this invention is to provide a facility for improving data recovery involving specially configured physical mirrors that can interact with multiple applications.

Still another object of this invention is to provide a data recovery operation that assures the integrity of data used in a restoration and stored on a device providing the restoration data.

Yet another object of this invention is provide a data recovery procedure during which restoration and update procedures operate concurrently.

This invention facilitates the recovery of data that is characterized by a restoring procedure for copying data to a first data store for a primary copy of the data from a second data store. The second data store operates in a first mode as a mirror to the first data store and in a second mode isolated from the first data store. An update procedure updates data on the first data store. The data recovery operation further includes preventing data transfers to locations in the second data store during the data recovery procedure. Restoration of the data includes identifying locations in the first data store and copying data to the identified locations in the first data store from corresponding identified locations in the second data store.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
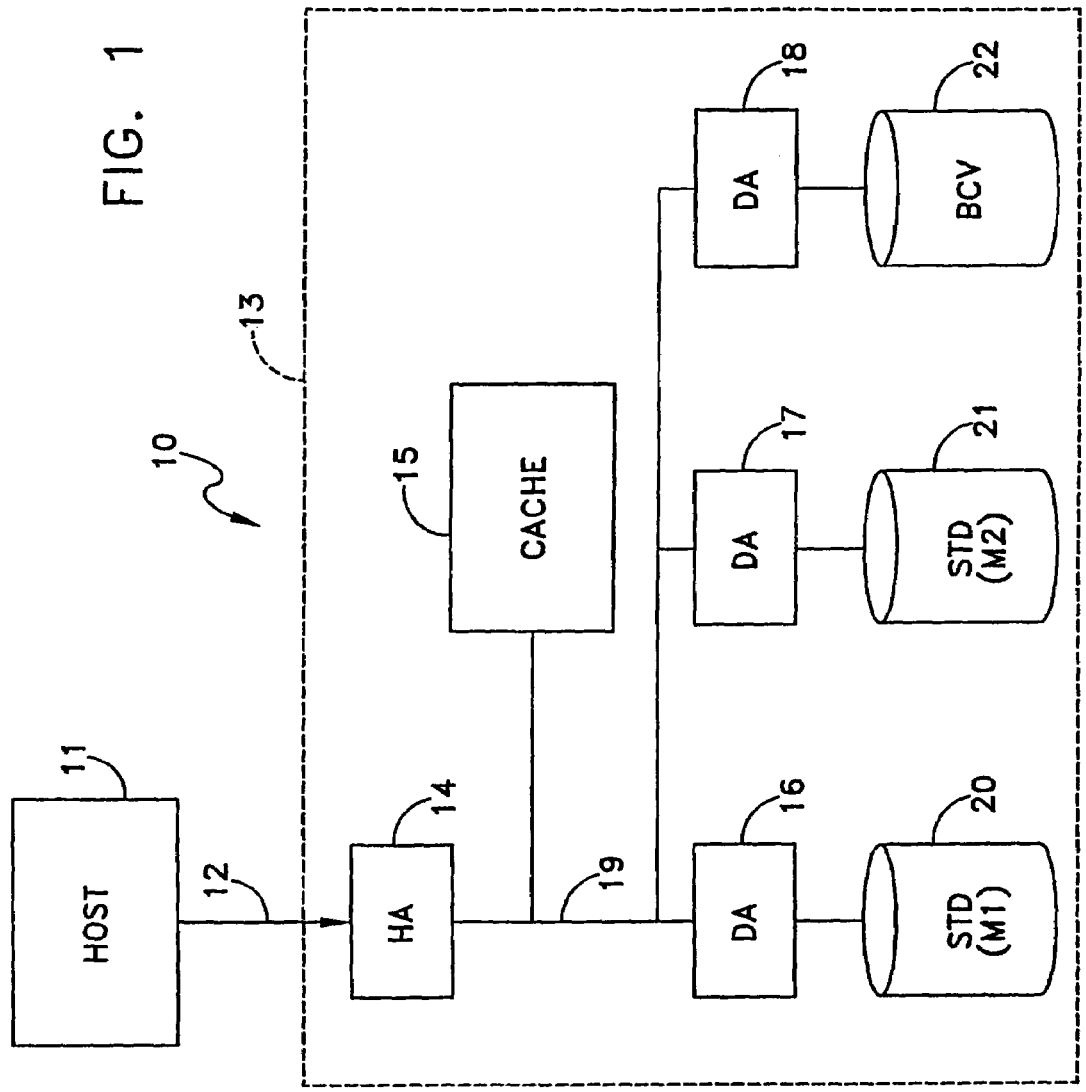
FIG. 1 is a block diagram of a specific embodiment of a data processing system that can implement this invention.

FIG. 1 depicts one example of a data processing system or network that can implement this invention. In this particular embodiment the configuration is that of a data processing system 10 with a host 11. Additional hosts can connect in parallel with the host 11 over a bus structure 12. A data storage facility 13 connects over the bus structure 12 to the host 11. In this particular embodiment the data storage facility 13 is a local facility that includes a plurality of data stores. As will become apparent, this invention can be applied to other configurations in which certain data stores are located in a geographically remote location or in which individual data stores or portions of data stores are distributed throughout a local-area or wide-area network.

FIG. 1 defines this invention in terms of a Symmetrix data storage facility manufactured and sold by the assignee of this invention. In such a data storage facility 13, a host adapter (HA) 14, that includes a microprocessor control, communicates with the host 11 and any other hosts on the bus structure 12. As known, hosts, such as the host 11, run application programs, or applications. The applications generate data transfer requests including read and write requests to transfer application-related data or "data" from or to transfer data to the data storage facility 13. The host adapter 14 acts as an interface between such hosts and the bus structures 12 and the remainder of the data storage facility, particularly a cache 15 and disk adapters 16, 17 and 18 over a bus structure 19. The data storage facility 13 may include additional disk adapters.

Each disk adapter connects to at least one physical disk drive. Physical disk drives store data on tracks grouped as logical volumes. A logical volume may include a subset of contiguous tracks on a physical disk drive, a full set of tracks in an entire physical disk drive or even tracks on multiple disk drives. The following discussion defines the invention in terms of devices that are equivalent to logical volumes and that act as mirrors. In this particular embodiment and for purposes of explanation, the disk adapter 16 controls a logical volume designated an STD(M1) physical mirror 20; the disk adapter 17, an STD(M2) physical mirror 21; and the disk adapter 18, a BCV physical mirror 22. The physical mirrors 20, 21 and 22 collectively define a standard device in which the STD(M1) and STD(M2) physical mirrors 20 and 21 are called "fixed mirrors" while the BCV physical mirror 22 is called a "moving mirror". The STD(M1) and STD(M2) fixed physical mirrors 20 and 21 act as a data store that stores two identical copies of the data. As described in U.S. Pat. No. 6,101,497, in one operating mode, the BCV physical mirror 21 constitutes a data store that acts as a mirror to the standard device in response to an ESTABLISH command generated by an application program in the host 11 or elsewhere to produce a third copy of the data. In FIG. 1 such a command causes the BCV physical mirror 21 to attach to and synchronize with the STD(M1) and STD(M2) physical mirrors 20 and 21.

In a second operating mode, that can have several variations, the BCV physical mirror 22 detaches from the standard device to be available for other purposes. For example, U.S. Pat. No. 6,101,497 defines a full split operation in which a BCV physical mirror detaches or splits from a standard device. In the context of this invention, such a split operation makes the data available for a backup to other media or even just to isolate a copy of the data on the standard device constituted, in this specific embodiment, by the STD(M1) and STD(M2) physical mirrors 20 and 21.

Figure 2:
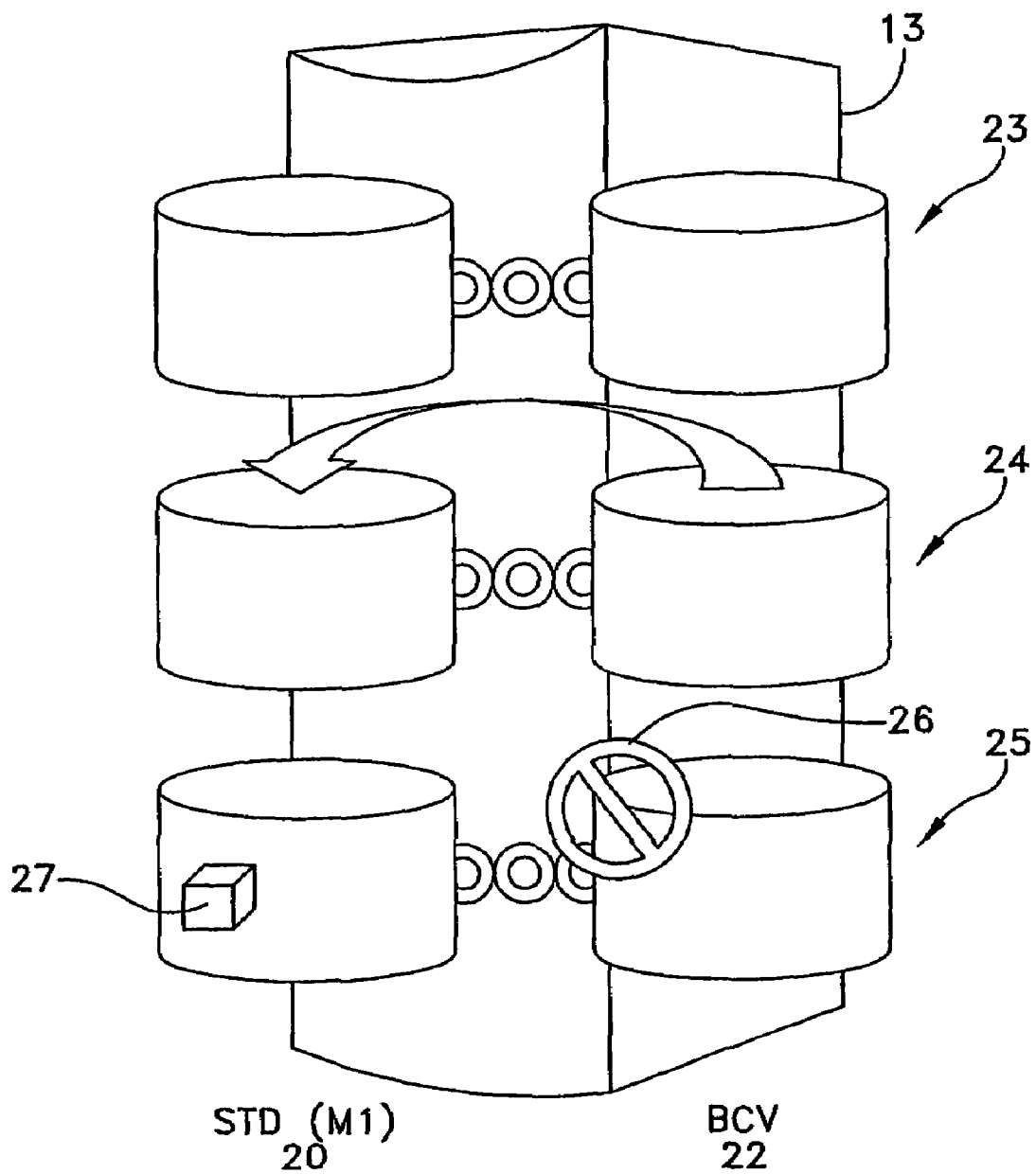
FIG. 2 is a pictorial diagram that is useful in understanding the basic operations of this invention.

FIG. 2 schematically depicts the STD(M1) 20 and BCV physical mirror 22 in the data storage facility 13 in different states that characterize this invention. A first state 23 exists after it is determined that corrupted data is stored in the standard device represented by the STD(M1) physical mirror 20. In the following description references to the STD (M1) physical mirror 20 are intended to be references generally to the standard device including the STD(M2) physical mirror 21. During state 23 the BCV physical mirror 22 attaches to the STD(M1) physical mirror 20 using many of the steps of a restore operation as defined in U.S. Pat. No. 6,101,497. During the restore operation at state 24, the data in the STD(M1) physical mirror 20 synchronizes with the data in the BCV physical mirror 22 so the data in standard device fixed mirrors, such as the STD(M1) physical mirror 20, corresponds to the data as it existed at a prior time, as when a last split operation occurred with respect to the BCV physical mirror 22.

Next, it is necessary to use logs or other means and methods to make the fixed mirrors of the standard device, such as the STD (M1) physical mirror 20, current. However, making the standard device current after a restore operation requires data to be written to the standard device. With a BCV physical mirror attached to the standard device, any such write operation alters the data in the BCV physical mirror 22. When such a write operation occurs, the data in the BCV physical mirror 22 is no longer be available as a source for another restoration of data from the BCV physical mirror 22.

In accordance with this invention, a command, called a PROTECTED RESTORE command, provides a data recovery procedure in which the data copy on the BCV physical mirror 22 remains unchanged during a data recovery operation and in which restoration and update procedures occur concurrently. Initially and prior to any write operation from a host, the BCV physical mirror 22 operating capabilities are changed, so it operates in a read only mode as represented by symbol 26. Thus, as shown by state 25, any write request 27 updates the fixed mirrors, such as the STD(M1) physical mirror 20, but can not alter the data on the BCV physical mirror 22. Any write request that causes an error during the update procedure, such as unrolling the redo logs, will not change the data in the BCV physical mirror 22. In that event another data recovery operation can be initiated for producing the states 23 and 24 without having to access other media or storage devices.

When the data recovery procedure has been completed successfully, it is possible to renew writing operations to the BCV physical mirror 22 and to synchronize the BCV physical mirror 22 to the data in a fixed mirror of the standard device, such as the STD (M1) physical mirror 20. For example, after a successful protected restore operation, the processing of a full SPLIT command enables write operations. An ESTABLISH command then initiates a resynchronization of the BCV physical mirror 22 to the restored and updated data in the STD(M1) and STD(M2) physical mirrors.

Figure 3:
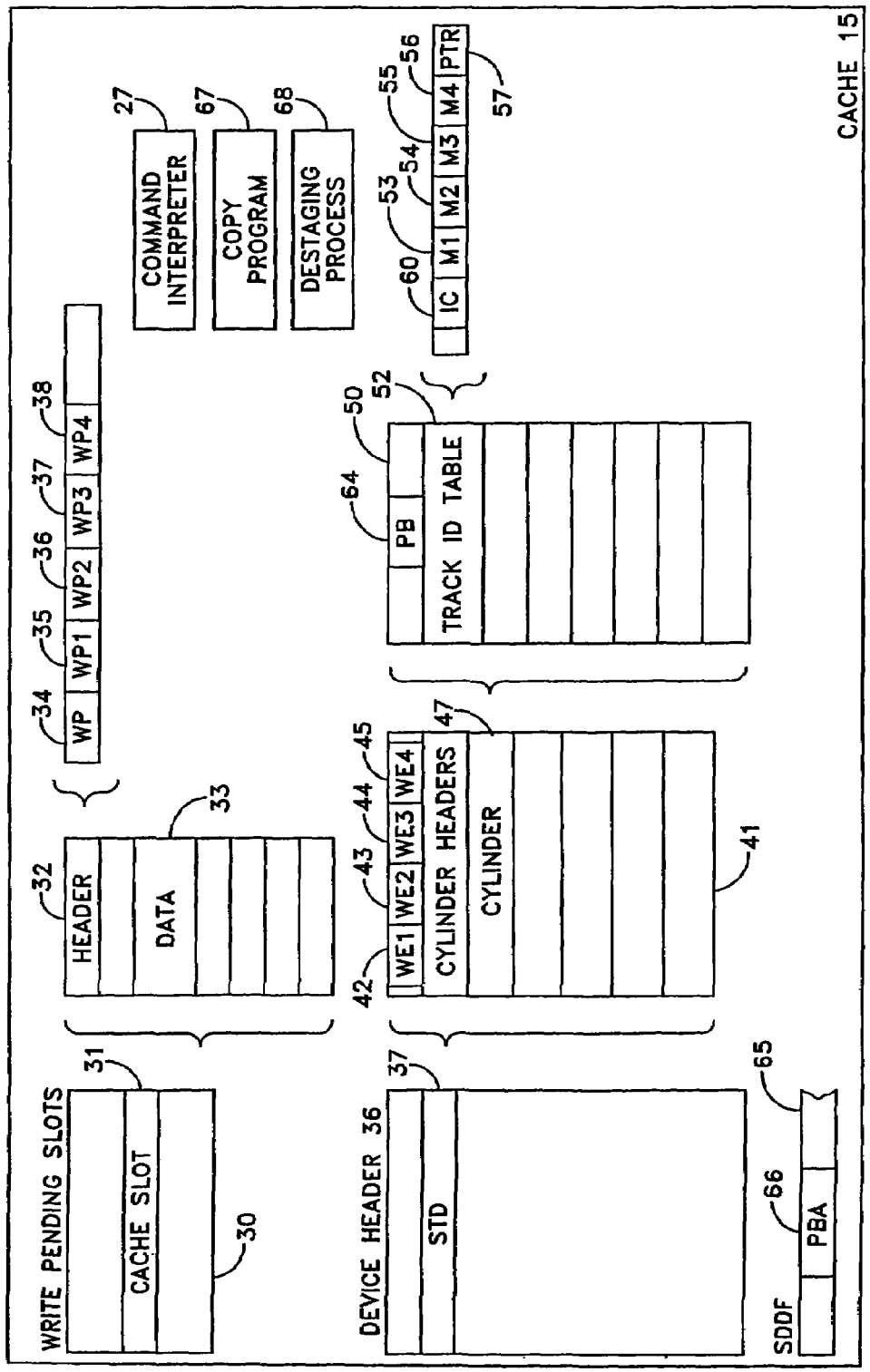
FIG. 3 depicts the organization of those parts of the cache in FIG. 1 that are relevant to this invention.

Before describing a response to a PROTECTED RESTORE command in detail, it will be helpful to review the organization of the cache 15 shown in FIG. 1, particularly those tables, flags and other entries that are relevant to this invention. Referring to FIG. 3, the cache 15 includes a command interpreter 27. The command interpreter 27 will contain the necessary programming that enables various operation in response to commands related to the BCV physical mirror 22 including a command like a PROTECTED RESTORE command as detailed in FIG. 4.

Still referring to FIG. 3, the cache 15 also includes write pending slots 30 with a particular cache slot 31 being shown in detail. Each cache slot includes a header 32 and data 33 to be written. The header 32 for a specific cache slot includes a WP flag 34 that is set when any of its WP1 through WP4 flags 35 through 38 is set. As known, the WP1 through WP4 flags in the header denote each mirror for a device and indicate whether a write pending is associated with any of the corresponding physical mirrors M1 through M4, respectively for that device. The BCV feature requires that flags associated with a fourth mirror, M4, be available for operations, so only three physical mirrors can be attached to a host. In the embodiment shown in FIG. 1, the host adapter 14 would set appropriate ones of the WP1 through WP3 flags 34 through 36 to indicate the existence of a write request to all the mirrors of the standard device.

In the specifically disclosed implementation each cache slot 31 may contain data for a "full track" write or a "partial track" write operation. A "full track" write will replace all the data on a single track. A "partial track" write may replace data in only a certain portion or in different portions of the track. Consequently, the information associated with each cache slot for a writing operation includes one or more address extents to define each track portion to be written. As described more fully later, an asynchronously operating destaging process identifies a write pending cache slot and a write pending flag, such as the WP1 flag 35, and transfers the data from the data buffer 33 to a corresponding physical mirror and then clears the write pending flag. When a subsequent destaging process clears any of WP flags 35 through 38 and all these flags are cleared, the destaging process clears the WP flag 34. When this occurs, it is possible to release the cache slot, such as the cache slot 31.

Device headers 36 includes a device header for each device. In the context of the system shown in FIG. 1, an STD header 37 is associated with the standard device that includes the STD(M1) and STD(M2) fixed physical mirrors 20 and 21 and, when attached, the BCV moving physical mirror 22. Device headers 36 contain other device headers and each header identifies the cylinders associated with its corresponding device. Cylinder blocks, such as a cylinder block 41 for the STD device, have similar structures.

Initial entries in the STD device header 37 include certain flags relevant to different operations. WE1 through WE4 flags 42 through 45 are of particular importance to this invention. Each flag denotes whether the corresponding physical mirror is write enabled. The cylinder block 41 also contains a list of all the cylinders associated with the standard device, such as a cylinder entry 47. Each cylinder entry has the same format; the cylinder entry 47, for example, comprises a header 50 and a Track ID Table 52 for each track in the cylinder. Each track entry, such as a track entry 52, includes M1 through M4 mirror bits 53 through 56 and a pointer (PTR) 57 to a cache slot. An In-Cache (IC) flag 60 indicates whether the data for that track is in the cache slot 31. Other flags and entries also may be included.

Each header, such as header 50, includes a PB field 64 with a bit assigned to each track in a particular cylinder. As specifically implemented, the PB field 64 is one of several like sections that can be assigned to specific functions. Each PB bit is set whenever a change is made to a track in the standard device. In an actual system there are multiple and assignable protection bit fields. An SDDF or similar register 65 includes a PBA field 66 that identifies which PB field is associated with the ESTABLISH and SPLIT operations. A selected PB table identifies each change made to a track in the standard device, specifically the STD(M1) and STD(M2) physical mirrors 20 and 21, since the processing of a prior split operation.

Figure 5:
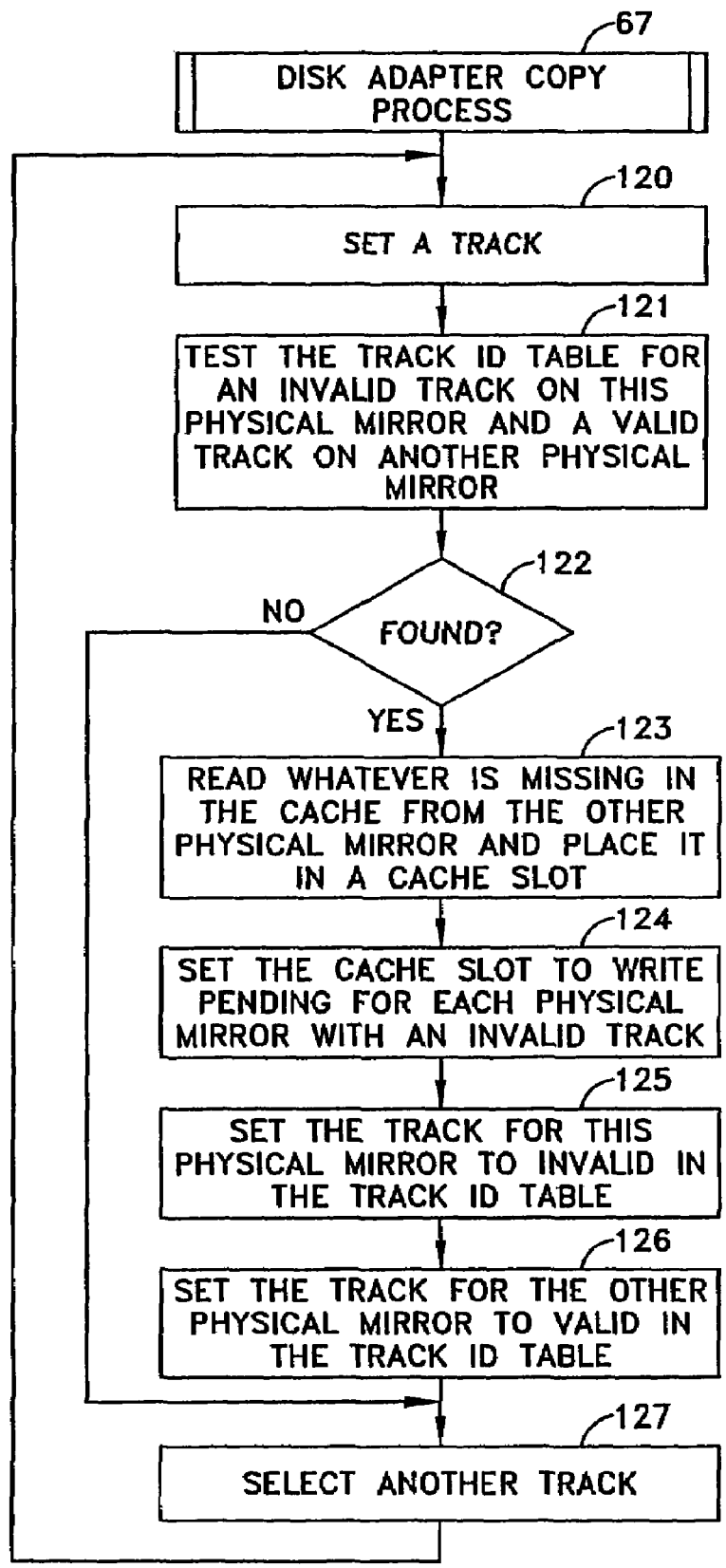
FIG. 5 is a flow diagram that depicts the operation of a copy process that performs various functions in accordance with FIG. 4.
Figure 7:
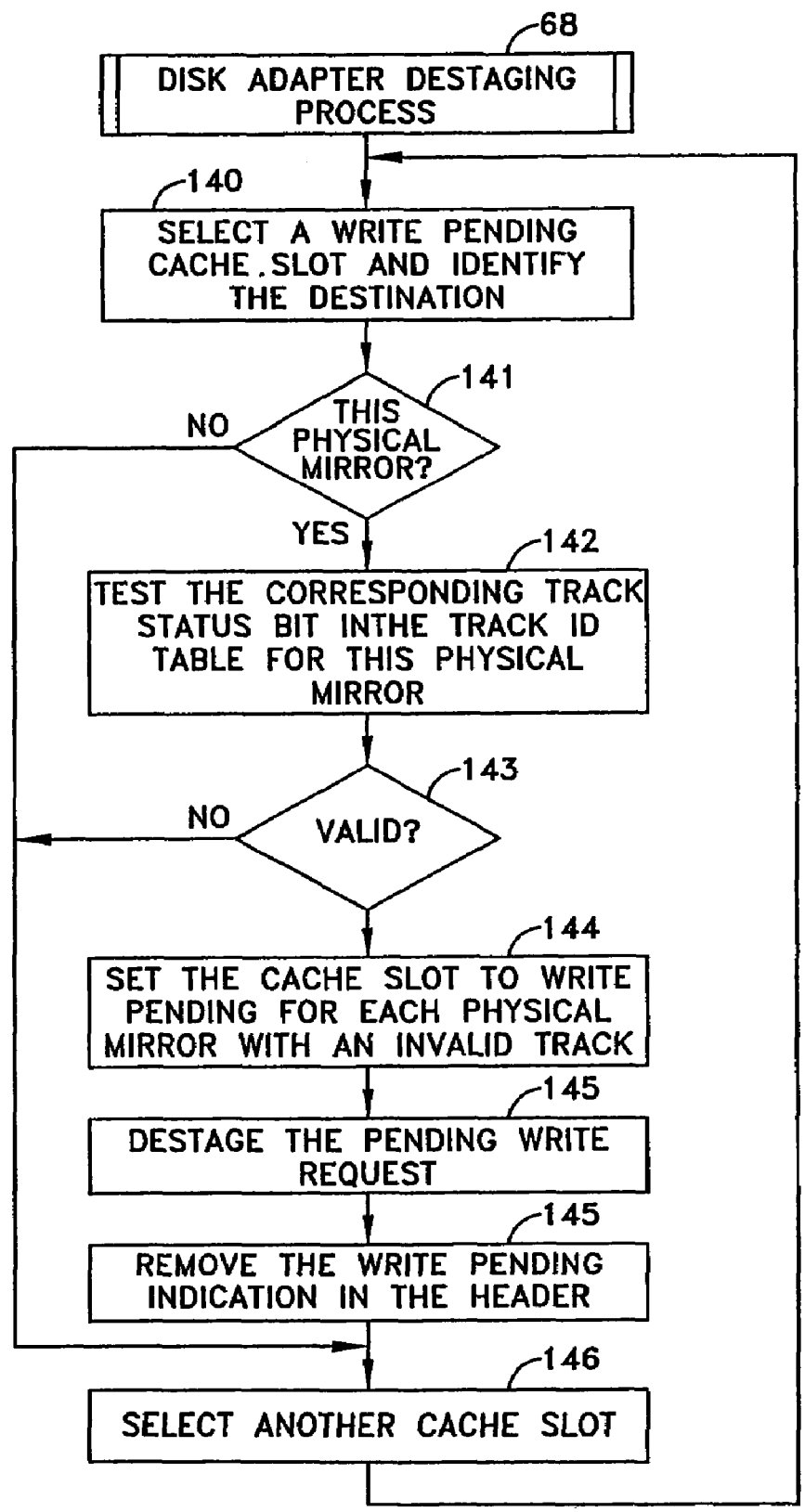
FIG. 7 is a flow diagram that depicts the operation of a destaging process that performs various functions in accordance with FIG. 6.

FIG. 3 also depicts a copy process 67. The copy process 67 runs asynchronously in response to specific arguments. Two arguments identify the source and destination for the copy operation. A third argument identifies a specific location in the source track identification table that lists each track to be copied. A destaging process 68 transfers data in a cache slot into a specific physical disk drive or mirror. Although shown in the cache 15 in FIG. 3, copies of these processes normally also reside in each disk adapter, such as the disk adapters 16, 17 and 18 in FIG. 1. Specific details of each process that are important to this invention are shown in FIGS. 5 and 7.

Figure 4:
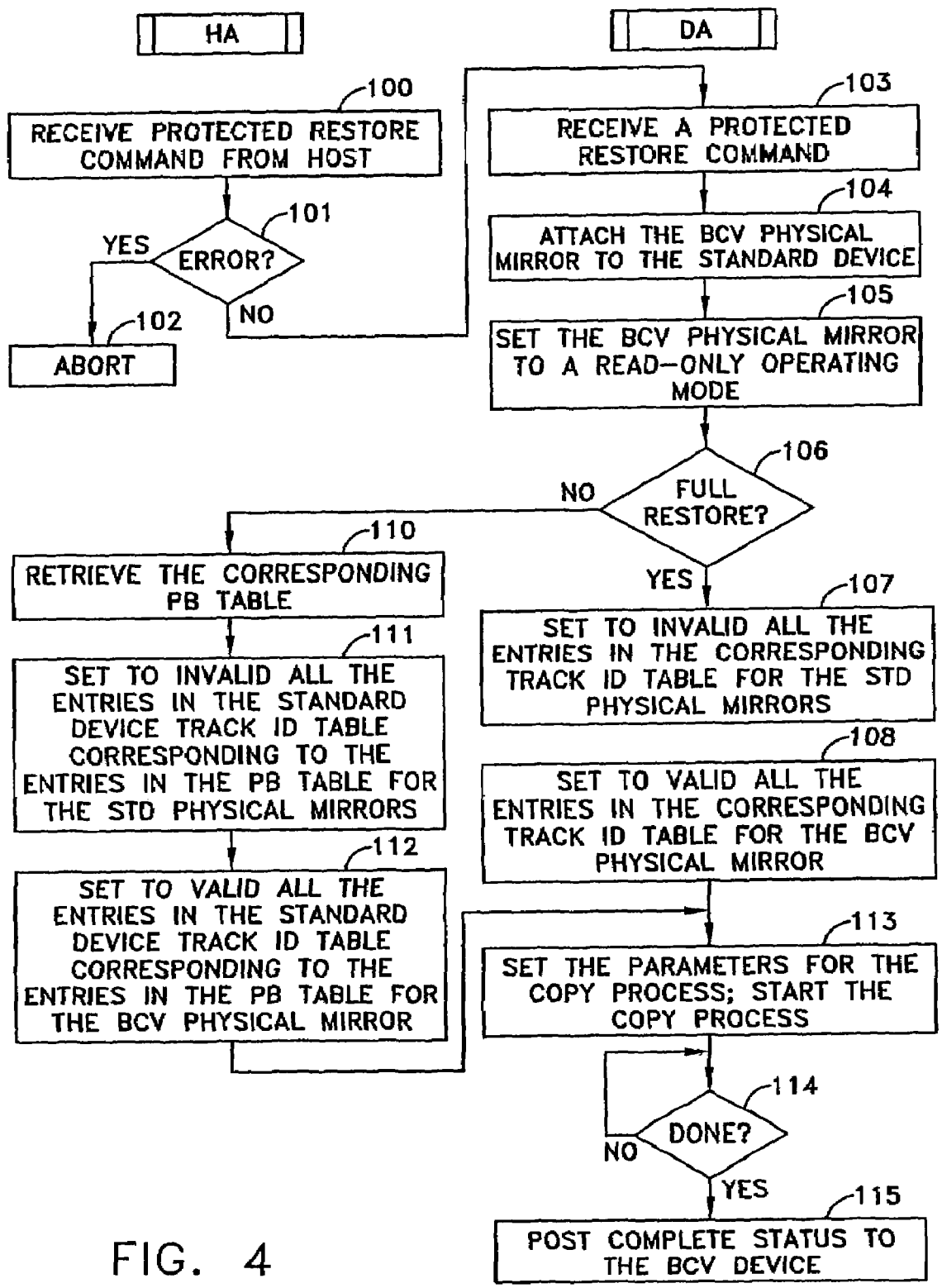
FIG. 4 is a flow diagram of a specific method for implementing a part of this invention.

FIG. 4 depicts the operation of a host adapter, such as the host adapter 14 in FIG. 1, in response to a PROTECTED RESTORE or like command that initiates a data recovery operation in accordance with this invention. The host adapter 14 receives that command from the host in step 100. If a syntax, context or other error exists, step 101 transfers control to an abort procedure 102 as known in the art. If no error exists, the host adapter 14 transfers the command onto the bus structure 19 for action by one of the disk adapters.

When the disk adapter 18 responds to a PROTECTED RESTORE command in step 103, it performs two functions. First, it attaches the BCV physical mirror to the standard device in step 104. Second, it sets the BCV physical mirror to a read-only operating mode in step 105. In the specific example shown in FIGS. 1 and 3, step 105 clears the WE3 flag 44. Consequently, while the BCV physical mirror 22 is attached to the standard device including the STD(M1) and STD(M2) fixed physical mirrors 20 and 21 and the WE3 flag 44 is cleared, no change made to the data in either of the STD fixed physical mirrors 20 and 21 propagates to the BCV moving physical mirror 22.

A PROTECTED RESTORE can initiate either be a full or incremental restoration procedure as part of the data recovery operation. The differences between a full and incremental restoration procedures are described in U.S. Pat. No. 6,101,497. For a full restoration procedure, where all the data in the backup will be transferred to the standard mirrors, step 106 transfers control to step 107. Step 107 sets to invalid all the entries in the corresponding track ID table for the standard STD(M1) and STD(M2) fixed physical mirrors. In the specific example of FIG. 3, step 107 sets all the M1 and M2 flags 53 and 54 to an invalid state. Step 108 then sets all the entries in the corresponding track ID table for the BCV moving physical mirror to a valid state. Thus, after steps 107 and 108 are processed, all the M1 and M2 bits in the track ID table associated with the fixed physical mirrors in the standard device are set to an invalid state while all the corresponding bits in the moving physical mirror are all set to a valid state.

For an incremental restore operation, where only selected tracks that have been updated since a last split operation will be restored, control transfers from step 106 to step 110 that retrieves the corresponding PB table, such as the PB table 64, in FIG. 3. The contents of the PB table, as previously indicated, denote changed tracks. Step 111 sets to invalid all the entries in the standard device track ID table corresponding to the entries in the standard device PB table for the STD(M1) and STD(M2) fixed physical mirrors. Step 112 sets to valid all the entries for the BCV moving physical mirror in the standard device track ID table corresponding to the entries for the PB table. For example, assume that track n has been changed since the last split operation. As a result of steps 110 through 112, the M1 and M2 bits for track n will denote an invalid state while the M3 bit will denote a valid state.

When either of the foregoing sets of steps concludes, all the valid data in the BCV physical mirror 22 is indicated by the M3 bits 55 in the track ID table and the corresponding tracks are designated to be invalid by the M1 and M2 bits 53 and 54. Thus, collectively the M1, M2 and M3 bits in this specific example denote each track that needs to be changed. In the case of full restore this will be all tracks; in the case of a incremental restore, selected tracks.

Once this identification has been completed, control transfers to step 113 that sets various parameters for the copy process, such as a version of the copy process 67 shown in FIG. 3 that resides in the disk adapter 18 to copy the data from all the tracks or selected tracks from the BCV physical mirror 22 to the STD(M1) and STD(M2) physical mirrors 20 and 21. This continues until all the data has been transferred whereupon step 114 transfers control to step 115 to post a complete status for the BCV physical mirror. The specific status information will depend upon a particular type of data processing system or environment in which the data storage facility is operating.

As the copy process 67 runs asynchronously, it constantly monitors each track ID table entry in succession concurrently with other operations. Step 120 in FIG. 5 represents the selection of a track. Step 121 tests the M1 through M4 flags 53 through 56 in the track ID table entry for the selected track. Specifically, step 121 determines whether an invalid track exists on the physical mirror for which the copy process is running and whether a valid track exists on any other physical mirror. If this combination is found, step 122 transfers control to step 123 to read whatever is missing in the cache from the other physical mirror. Step 124 sets the cache slot to a write pending for each physical mirror with an invalid track. Step 125 sets the track in the corresponding track ID table for the physical mirror running the copy process to a valid state. Step 126, as a specific step for implementing this invention, sets the track for the other physical memory that supplies the data to an invalid state. Control then transfers to step 127 to select another track.

If the copy process 67 were allowed to run until all data was restored without any attempt to update the data in a concurrent update procedure, the copy process 67 would terminate in each of the fixed mirrors when all the corresponding M1 and M2 bits were valid. At that time all of the M1, M2 and M3 bits for all the tracks in the case of a full restore, or for the tracks selected by the PB bits in the case of an incremental restore, would reflect valid tracks.

Figure 6:
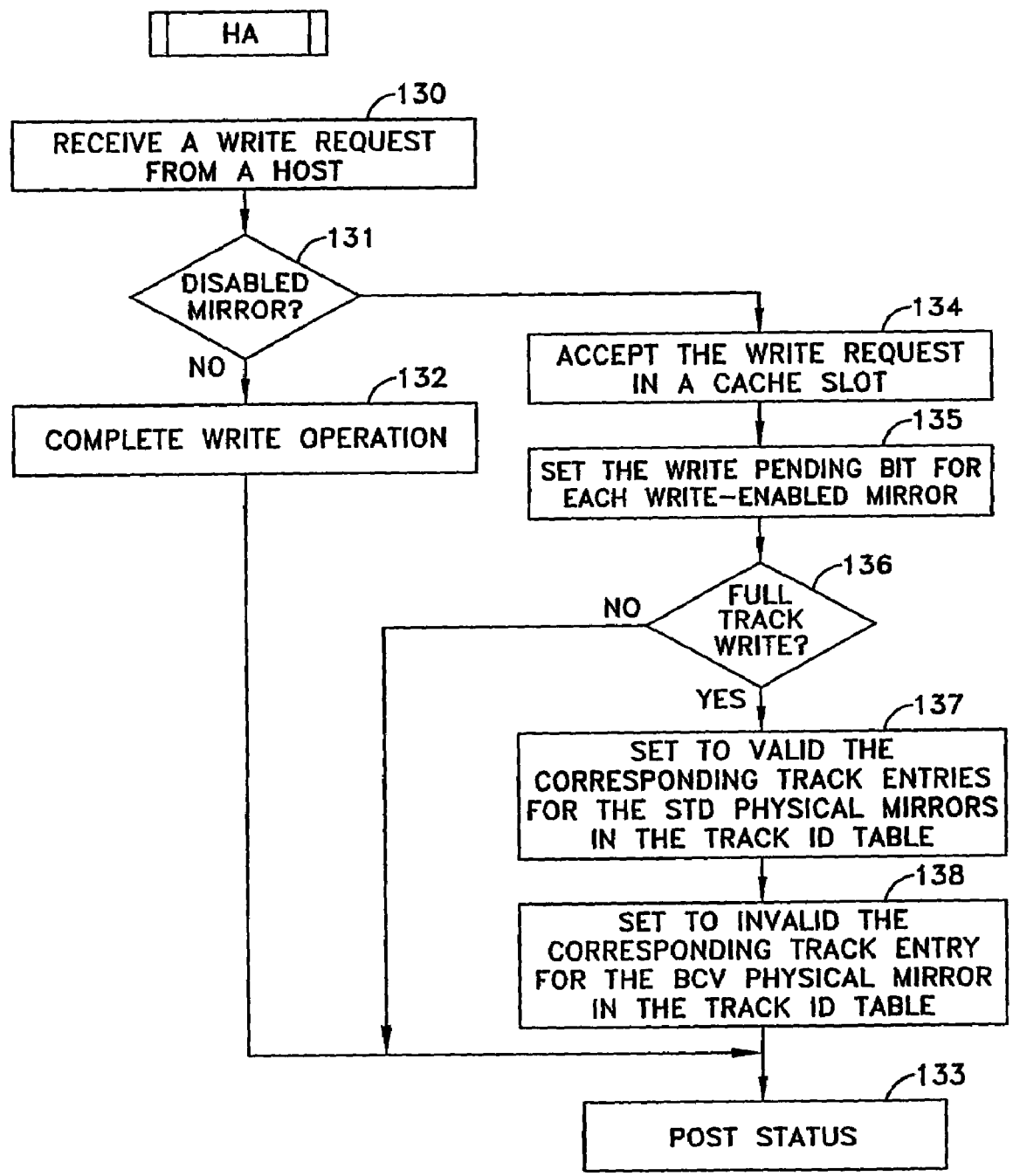
FIG. 6 is a flow diagram that depicts a response to a write operating in accordance with this invention.

In accordance with another feature of this invention, it is actually possible to begin an update procedure, such as unrolling the redo logs, concurrently with the restoration procedure that synchronizes the STD(M1) and STD(M2) physical mirrors 20 and 21 to the data in the BCV physical mirror 22. An update procedure generates write requests to full or partial tracks. FIG. 6 depicts the process for handling such write requests. Specifically, when a host adapter, such as the host adapter 14, receives a write request from a host at step 130 it determines whether any disabled mirrors exist. That is, step 131 examines the WE1 through WE4 flags 42 through 45 for the device. If they indicate all physical mirrors associated with the device are write enabled, by definition, the write request does not occur when the PROTECTED RESTORE command is being processed. Thus, step 131 transfers control to step 132 to complete the write operation in a conventional manner. Step 133 posts appropriate status for the host.

If a PROTECTED RESTORE command is being processed in accordance with this invention, the BCV physical mirror 22 is not write enabled so the state of the WE3 bit, in this example, indicates that condition. Step 131 then transfers control to step 134. Step 134 accepts the write request in a cache slot in the write pending slots 30 of FIG. 3. Step 135 then sets the write pending bits for each write enabled mirror in the standard device. In the specific example of FIG. 3, step 135 sets the WP, WP1 and WP2 write pending flags 35 and 36, but not the WP3 write pending flag 37.

Step 136 determines whether the write operation is for a full or partial track. If a full track will be written, step 137 sets to valid the corresponding track entry for the standard fixed physical mirrors. Step 138 sets to invalid the corresponding track entry for the BCV moving physical mirror. This indicates that the data in the standard fixed physical mirrors has been updated and that a change has occurred with respect to the data in the BCV moving physical device. After this step completes, step 138 transfers control to step 133 to post appropriate status.

Thus the response of the host adapter 14 as set forth in FIG. 6 places data to be written in cache slots for each write enabled mirror. As known, a destaging process, such as the destaging process 68 in FIG. 3, makes the actual transfer from a cache slot to a track on the physical mirror. FIG. 7 depicts that destaging process 68 as will operate in each of the disk adapters.

Like the copy process 67, the destaging process 68 operates asynchronously in each disk adapter to monitor each active cache slot. Referring to FIG. 7, step 140 selects a pending cache slot and identifies the active WP flags. If the write pending flag for the physical mirror running the destaging process 68 is set, step 141 transfers control to step 142. Step 142 tests the corresponding track status bit in the track ID table for this physical mirror. If the track is valid, step 143 transfers control to step 144 to destage the pending write request. Destaging the cache slot copies the data to the corresponding physical mirror. Step 145 removes the write pending indication in the header by clearing the corresponding WP flag. Then control transfers to step 146 that selects another cache slot. If step 141 determines that the cache slot does not identify the physical mirror running the destaging process or if step 143 determines that the corresponding track is invalid, control transfers from steps 141 and 143, respectively to step 146 and no action is taken.

With this understanding of the four processes included with a PROTECTED RESTORE command, it will be possible to illustrate their interactions with respect to specific examples that arise during a data recovery operation in accordance with this invention. As a first example, assume that the copy process 67 acts on a track prior to any write request issued by an update procedure so that, for that track, the M1, M2 and M3 flags are all set to a valid state. Assume that after the copy process, the host adapter issues a full track write request as part of the update procedure. When that write request is received, step 135 in FIG. 6 sets the WP, WP1 and WP2 flags for the cache slot. It will not set the WP3 flag because the BCV physical mirror 22 is not write enabled. As a full track write is assumed, step 136 transfers to step 133. Subsequently, step 141 in the destaging process in the STD(M1) physical mirror 20, as being representative of the operations that occur in both the physical mirrors 20 and 21, will determine that the WP flag for that physical mirror is set and step 143 will determine that the corresponding track status bit, i.e., the M1 flag, is valid. Step 144 writes the entire track in the corresponding fixed physical mirror while step 145 clears the WP1 flag. If only the WP and WP1 flags are set, step 145 clears the WP flag, as known. Although the destaging process 68 is active in the BCV physical mirror, nothing happens because the WP3 flag is cleared.

As a second example, assume that a write request during an update procedure after the track has been copied is a partial track write request. At the completion of the processing in FIG. 6, the M1 and M2 flags for the track are invalid while the M3 flag is valid. The destaging process operating in each fixed mirror takes action because step 143 determines that the track is invalid. Thus the partial write remains in the cache slot without being transferred and the WP1 flag remains set. At some time after this occurs the copy process 67 in FIG. 5 again selects the track and step 123 reads data from the corresponding track in the BCV physical mirror 22 to complete the data in the partially written cache slot for that track. Next the M1 and M2 entries for that track are set to a valid state in step 125 and the M3 entry is set to an invalid state.

When the destaging process 68 in FIG. 7 selects that track again, the M1 flag is valid and the M3 flag is invalid. Step 141 in FIG. 7 transfers control to step 142. As the M1 flag is valid, step 143 allows the destaging process to transfer the data for the pending write request along with all the other unchanged data in the track to the corresponding fixed physical mirror and shifts the corresponding WP flag to a valid state. No change occurs with respect to the status of the M1 through M3 flags.

As a third example, assume that the host issues a write request to a track before the copy process acts on that track. In that case the M1 and M2 flags for that track define an invalid state and the M3 flag defines a valid state. Step 135 if FIG. 6 sets the WP, WP1 and WP2 flags. Assuming that the host issues a full track write request, step 136 transfers control to steps 137 and 138 after which the M1 and M2 flags define a valid state and the M3 flag defines an invalid state. When the destaging process 68 in FIG. 7 selects that track, steps 141 and 143 transfer control to step 144 to destage the pending write request and shift the corresponding WP flag to an inactive state.

As a fourth example, assume the write request prior to copying the track is a partial write request, the response outlined in FIG. 6 accepts the request and sets the WP, WP1 and W2 write pending bits, but does not alter the M1, M2 or M3 flags. Consequently the M1 and M2 flags define an invalid state and the M3 flag defines a valid state. When the destaging process for one of the fixed physical mirrors, such as the STD(M1) fixed physical mirror 20, selects the cache slot, step 141 transfers control to step 142. In this case the M1 bit is still invalid so control passes from step 143 to step 146 and the partial track write data is not destaged. However, during a subsequent copy process, as shown in FIG. 5, the test in step 121 identifies the appropriate combination so step 123 identifies the data in the cache by its address extents and supplements that information with the data from the BCV that is not in the partial write operation. Step 124 then sets the appropriate WP flag, in this case the WP1 flag. Step 125 sets the M1 flag to an invalid state and step 126 sets the M3 flag to a valid state. Consequently the next time the destaging process in FIG. 7 selects that write pending cache slot, step 142 finds a valid M1 flag. Steps 144 and 145 destage the full track to the STD(M1) physical mirror 20.

As will now be apparent, the foregoing processes and procedures collectively interact to achieve all of the objectives of this invention. During the steps of shifting the restore data as it appeared in the BCV physical volume 22 to a current state by some update procedure such as unrolling the redo logs, the data in the BCV physical mirror 22 is not altered. So the integrity of the data on the BCV physical mirror 22 remains throughout the data recovery operation. On completion of the data recovery operation, the track status bits for the BCV moving physical mirror, represented by the M3 flags in this particular example, identify all those tracks that have been changed. Once there is assurance that the procedure of unrolling the redo logs has been completed successfully, the BCV physical volume can be split from the STD(M1) and STD(M2) physical mirrors 20 and 21 and then either established or reestablished as a mirror. As known, an establishing, or mirroring, command transfers all the data from the standard physical mirrors to the BCV physical mirror 22. Reestablishing transfers only those tracks for which the M3 flag remains invalid.

Moreover, this invention enables a data recovery operation to process the restoration procedure of FIGS. 4 and 5 concurrently with the update procedure of FIGS. 6 and 7. Consequently the implementation of a command like the PROTECTED RESTORE operation adds to the armamentarium of commands available to overcome problems that can occur during data recovery operations.

There are many variations that can be made to the specifically disclosed embodiment shown in FIGS. 1 through 7. FIGS. 3 through 7, for example, depict a specific organization of tables and modules associated with a specific data storage facility in which a host produces the specifically described PROTECTED RESTORE command. Different configurations of the information could be substituted without detracting from the overall operation of the system.

Also, it will be apparent that the broad functionality of the invention can be applied to many diverse local, remote and network-based systems including local hosts, servers and applications. This invention is described in conjunction with a pair of fixed mirrors, the STD(M1) and STD(M2) physical mirrors 20 and 21, and with a BCV physical mirror 22 as a moving mirror. Generally a device will include multiple logical devices, each of which could be organized in the same way be replicating the operation and apparatus shown in FIGS. 1 through 7. In other applications a single fixed physical mirror could replace the two disclosed fixed physical mirrors.

Moreover, the description of the PROTECTED RESTORE command establishes a specific sequence of events for purposes of explanation. Other sequences might also be included with the elimination of some or addition of other operations depending upon a specific implementation. Such sequences can be under manual control so that each transfer between operating modes will be initiated by a system operator. Alternatively, all or portions of such operations might be under automatic control from different sources. Thus, while this invention has been disclosed in terms of a specific embodiment for purposes of explaining this invention, it is the intent of the appended claims to cover all such variations and modifications as come within the true spirit and scope of this invention.

What is claimed as new and desired to be secured by Letters Patent of the United States is:

1. A method for facilitating a data recovery to a first data store from a second data store in a data processing system wherein changes to the data in the first data store are recorded and wherein the second data store is operable in a first mode as a mirror to the first data store wherein a protected data recovery allows the first data store to be restored without changing the data in the second data store characterized by:
   A) setting the second data store to a read-only mode thereby disabling the transfer of data to locations in the second data store,
   B) restoring the first data store by copying data from the second data store to the first data store with the second data store in the read-only mode,
   C) updating the first data store by writing data from the record of updates to the first data store while the second data store remains in the read-only mode,
   D) recording the changes to the first data store during said updating,
   E) changing the second data store to a read-write mode, and
   F) transferring data from the first data store to the second data store to bring the second data store into synchronism with the data in the first data store.

2. A method as recited in claim 1 wherein said method includes the step of monitoring the operation of said restoring and said updating to enable the restoration and updating processes to operate concurrently.

3. A method as recited in claim 2 wherein each of the data stores maintains status information for monitoring the validity of the data in the storage locations of the first and second data stores and wherein said copy process transfers data to a storage location in the first data store prior to a write operation whereby the status information for the first and second data stores indicate that the data in those locations are invalid and valid, respectively.

4. A method as recited in claim 3 wherein the updating procedure writes an entire storage location in the first data store and wherein the writing process causes the status information to indicate that the data in the first and second data stores are valid and invalid, respectively.

5. A method as recited in claim 3 wherein the updating procedure writes a portion of a storage location in the first data store, said writing process causing the status information to indicate that the data in the storage locations in the first and second data stores are invalid and valid, respectively, whereby said copy process initiates a transfer of the combined written data and data from the second data store to the storage location in the first data store.

6. A method as recited in claim 2 wherein each of the data stores has associated status information for monitoring the validity of the data in the storage locations of the first and second data stores and wherein the updating procedure transfers written data to a storage location in the first data store prior to the restoration procedure, the transfer of data to a location in the first data store by the writing process being dependent upon an indication in the status information of valid data in the first data store location.

7. Apparatus for facilitating a data recovery to a first data store from a second data store in a data processing system wherein changes to the data in the first data store are recorded and wherein the second data store is operable in a first mode as a mirror to the first data store wherein a protected data recovery allows the first data store to be restored without changing the data in the second data store characterized by:
   A) mode setting means for setting the second data store to a read-only mode thereby disabling the transfer of data to locations in the second data store,
   B) means for restoring the first data store including means for copying data from the second data store to the first data store with the second data store in the read-only mode,
   C) means for updating the first data store including means for writing data from the record of updates to the first data store while the second data store remains in the read-only mode,
   D) means for recording the changes to the first data store during said updating upon completion of which said mode setting means changes the second data store to a read-write mode, whereupon the second data store is brought into synchronism with the first data store.

8. Apparatus as recited in claim 7 including means for monitoring the operation of said restoring means and said updating means to enable the restoration and updating processes to operate concurrently.

9. Apparatus as recited in claim 8 wherein each of the data stores includes means for maintaining status information that indicates the validity of the data in the storage locations of the first and second data stores, said maintaining means being responsive to the copying during operation of said restoring means to establish a status indicating the first and second data stores are invalid and valid, respectively.

10. Apparatus as recited in claim 9 wherein said updating means writes an entire storage location in the first data store and said maintaining means establishes a status indicating that the data in the first and second data stores are valid and invalid, respectively.

11. Apparatus as recited in claim 9 wherein said updating means writes a portion of a storage location in the first data store and said maintaining means establishes a status indicating that the data in the storage locations in the first and second data stores are invalid and valid, respectively, said copy means initiating a transfer of the combined written data and data from the second data store to the storage location in the first data store.

12. Apparatus as recited in claim 8 wherein each of the data stores has associated status information for monitoring the validity of the data in the storage locations of the first and second data stores and wherein said updating means transfers written data to a storage location in the first data store prior to the operation of said restoring means, said operation of said writing means being dependent upon an indication in the status information of valid data in the first data store location.

13. A data recovery program for facilitating a data recovery to a first data store from a second data store in a data processing system wherein changes to the data in the first data store are recorded and wherein the second data store is operable in a first mode as a mirror to the first data store wherein a protected data recovery allows the first data store to be restored without changing the data in the second data store characterized by:
   A) setting the second data store to a read-only mode thereby disabling the transfer of data to locations in the second data store, B) restoring the first data store by copying data from the second data store to the first data store with the second data store in the read-only mode,
C) updating the first data store by writing data from the record of updates to the first data store while the second data store remains in the read-only mode,
D) recording the changes to the first data store during said updating,
E) changing the second data store to a read-write mode, and
F) transferring data from the first data store to the second data store to bring the second data store into synchronism with the data in the first data store.

14. A data recovery program as recited in claim 13 wherein said method includes the step of monitoring the operation of said restoring and said updating to enable the restoration and updating processes to operate concurrently.

15. A data recovery program as recited in claim 14 wherein each of the data stores maintains status information for monitoring the validity of the data in the storage locations of the first and second data stores and wherein said copy process transfers data to a storage location in the first data store prior to a write operation whereby the status information for the first and second data stores indicate that the data in those locations are invalid and valid, respectively.

16. A data recovery program as recited in claim 15 wherein the updating procedure writes an entire storage location in the first data store and wherein the writing process causes the status information to indicate that the data in the first and second data stores are valid and invalid, respectively.

17. A data recovery program as recited in claim 15 wherein the updating procedure writes a portion of a storage location in the first data store, said writing process causing the status information to indicate that the data in the storage locations in the first and second data stores are invalid and valid, respectively, whereby said copy process initiates a transfer of the combined written data and data from the second data store to the storage location in the first data store.

18. A data recovery program as recited in claim 14 wherein each of the data stores has associated status information for monitoring the validity of the data in the storage locations of the first and second data stores and wherein the updating procedure transfers written data to a storage location in the first data store prior to the restoration procedure, the transfer of data to a location in the first data store by the writing process being dependent upon an indication in the status information of valid data in the first data store location.

* * * * *